(12) United States Patent
High et al.

(10) Patent No.: US 10,543,936 B2
(45) Date of Patent: Jan. 28, 2020

(54) WINDOW UNIT FOR UAV DELIVERY

(71) Applicant: Walmart Apollo, LLC, Bentonville, AR (US)

(72) Inventors: Donald R. High, Noel, MO (US); Robert Cantrell, Herndon, VA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/366,295

(22) Filed: Mar. 27, 2019

(65) Prior Publication Data
US 2019/0300203 A1    Oct. 3, 2019

Related U.S. Application Data

(60) Provisional application No. 62/649,975, filed on Mar. 29, 2018.

(51) Int. Cl.
*B64D 1/02* (2006.01)
*B64F 1/36* (2017.01)
*B64C 39/02* (2006.01)

(52) U.S. Cl.
CPC ............... *B64F 1/368* (2013.01); *B64D 1/02* (2013.01); *B64C 39/024* (2013.01); *B64C 2201/128* (2013.01)

(58) Field of Classification Search
CPC .......... B64F 1/368; B64D 1/02; B64C 39/024
See application file for complete search history.

(56) References Cited

U.S. PATENT DOCUMENTS

| 4,460,195 A | 7/1984 | Bildner |
| 8,511,606 B1 * | 8/2013 | Lutke ............... B64C 39/028 244/100 R |
| 8,880,241 B2 * | 11/2014 | Mohamadi ............ B64C 19/00 244/190 |
| 9,284,062 B2 * | 3/2016 | Wang .................... B64F 1/20 |
| 9,387,928 B1 * | 7/2016 | Gentry ................ B64C 39/024 |
| 9,811,796 B2 | 11/2017 | Ogilvie et al. |

(Continued)

FOREIGN PATENT DOCUMENTS

| GB | 2521651 A | 7/2015 |
| WO | 2018000026 A1 | 1/2018 |

OTHER PUBLICATIONS

Nick Lavers, "Drone delivery nets could be the mailboxes of the future", New Atlas, Nov. 18, 2014, pp. 1-3.

(Continued)

*Primary Examiner* — Justin M Benedik
(74) *Attorney, Agent, or Firm* — Venable LLP; Jeffri A. Kaminski

(57) ABSTRACT

A window unit for receiving a package from an aerial vehicle to a window of a building. The window unit includes a frame and a net. The frame is coupled to a building wall and a window ledge. The net is coupled within the frame. The net receives delivery of the package. The window unit includes sensors and communication devices to confirm alignment of the package and effectuate delivery of the package. The window unit includes a release device for releasing the frame or net if there is a snag with the package or aerial vehicle. A method of delivering a package to the window unit includes confirming the package is aligned with the net prior to release of the package from the aerial vehicle.

5 Claims, 4 Drawing Sheets

(56) References Cited

U.S. PATENT DOCUMENTS

| | | |
|---|---|---|
| 9,840,340 B2 | 12/2017 | O'Toole |
| 2015/0158599 A1* | 6/2015 | Sisko ........................ B64F 1/32 244/114 R |
| 2015/0175276 A1* | 6/2015 | Koster ...................... B64F 1/32 244/114 R |
| 2015/0183528 A1 | 7/2015 | Walsh et al. |
| 2016/0033966 A1 | 2/2016 | Farris et al. |
| 2016/0196756 A1* | 7/2016 | Prakash ................ B64C 39/024 701/3 |
| 2017/0255896 A1 | 9/2017 | Van Dyke |
| 2018/0049575 A1 | 2/2018 | Yamrick |

OTHER PUBLICATIONS

International Search Report and Written Opinion dated Jun. 13, 2019, issued in corresponding PCT Application No. PCT/US2019/024290.

* cited by examiner

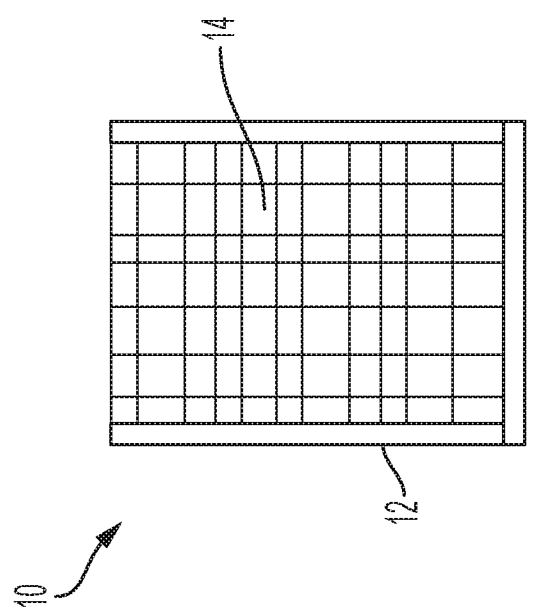

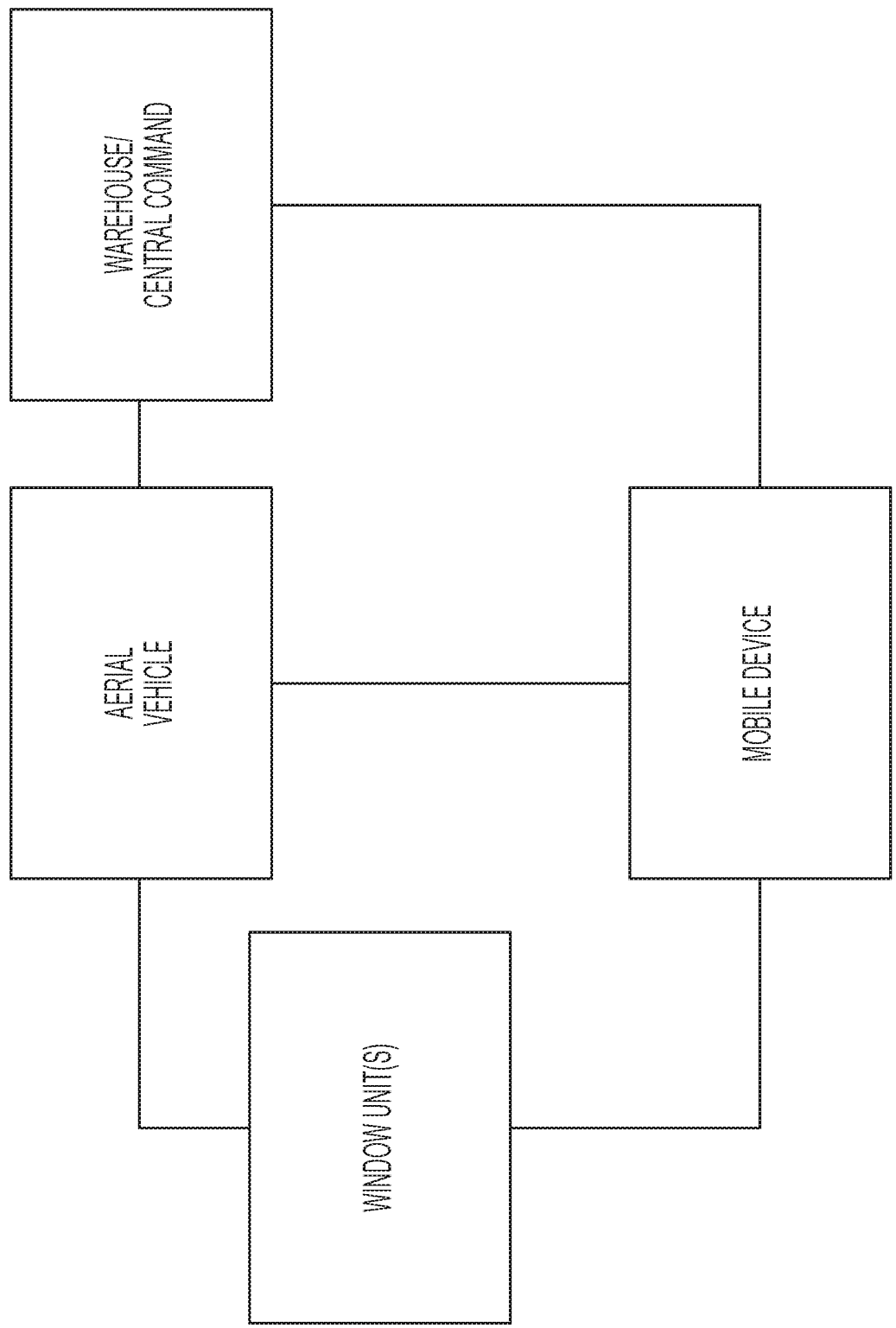

WINDOW UNIT FOR UAV DELIVERY

CROSS REFERENCE TO RELATED APPLICATIONS

This present Patent Application claims priority benefit from U.S. Provisional Patent Application No. 62/649,975 filed on Mar. 29, 2018, the entire content of which is hereby incorporated herein by reference.

TECHNICAL FIELD OF THE INVENTION

The present application relates to a delivery location for receiving a package from a vehicle. More specifically, the present application relates to a window unit for aerial vehicle package delivery.

BACKGROUND OF THE INVENTION

Currently, delivery locations for receiving packages from aerial vehicles may include the ground surface or permanent delivery structures. The aerial vehicles may be programed for a controlled delivery from a first controlled point (such as a warehouse or store) to a second controlled point, or delivery location. Existing delivery structures may be sophisticated, expensive, complex, and have a large permanent footprint. Thus, existing delivery structures are not suitable for smaller delivery locations, such as homes and urban areas. Delivery of packages to ground locations may be difficulty or not desired in high density urban locations. Therefore, a need exists for a delivery location which may be used in a home, convenience store, or other urban area and may reduce the cost and footprint of existing delivery structures. A need further exists for a delivery tower which allows delivery of packages at locations at higher vertical locations than the ground surface to facilitate delivery to urban locations or tall buildings, such as high-rise or medium-rise buildings.

BRIEF SUMMARY OF THE INVENTION

According to an embodiment, a window unit for receiving a package from an aerial vehicle to a window of a building includes a frame coupled to a building support member and a window support member; a net coupled within the frame, the net configured to receive the package from the aerial vehicle; a release device configured to release the frame or the net; and a sensor for detecting presence of the package. The window unit is configured to move between a stored position and a deployed position, and the sensor is configured to detect the package is located within a boundary of the frame and the net and the sensor is configured to communicate with the aerial vehicle to confirm alignment of the package with the frame and net prior to release of the package from the aerial vehicle.

According to an embodiment, a method for aerial delivery of a package to a window of a building includes providing a window unit adjacent the window, the window unit including a frame and a net; moving the window unit from a stored position to a deployed position; sensing the package is aligned within a boundary of the window unit; communicating the package is aligned within the boundary of the window unit with an aerial vehicle; lowering a delivery mechanism of the aerial vehicle, the delivery mechanism coupled to the package; releasing the package from the delivery mechanism; moving the package toward the window; and retrieving the package from the window unit.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 3 shows a schematic of a top view of a net of the window unit delivery tower of FIG. 1; and FIG. 4 shows a block diagram of a delivery system including a window unit delivery tower, according to an embodiment of the present disclosure.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. A person skilled in the relevant art would recognize that other equivalent parts can be employed and other methods developed without departing from the spirit and scope of the invention. All references cited herein are incorporated by reference as if each had been individually incorporated.

The present disclosure relates to delivering packages to a particular location, such as a home or store (such as a corner store, convenience store, etc.), high-rise building, medium-rise building, skyscraper, other tall building, or other location. The particular location of delivery may include a window unit, as will be described below. The window unit may have a frame holding a net. The window unit may protrude perpendicular from a window and/or a building wall. The window unit may be moveable between a retracted position and an extended position. The window unit may have one or more sensors, a release mechanism, a controller, and/or a communications module for controlling deployment, package delivery, location, and operation of the window unit and for communicating with the aerial vehicle, such as a UAV. The window unit may allow for confirmation of alignment of the package prior to delivery by the aerial vehicle.

Figure 1:
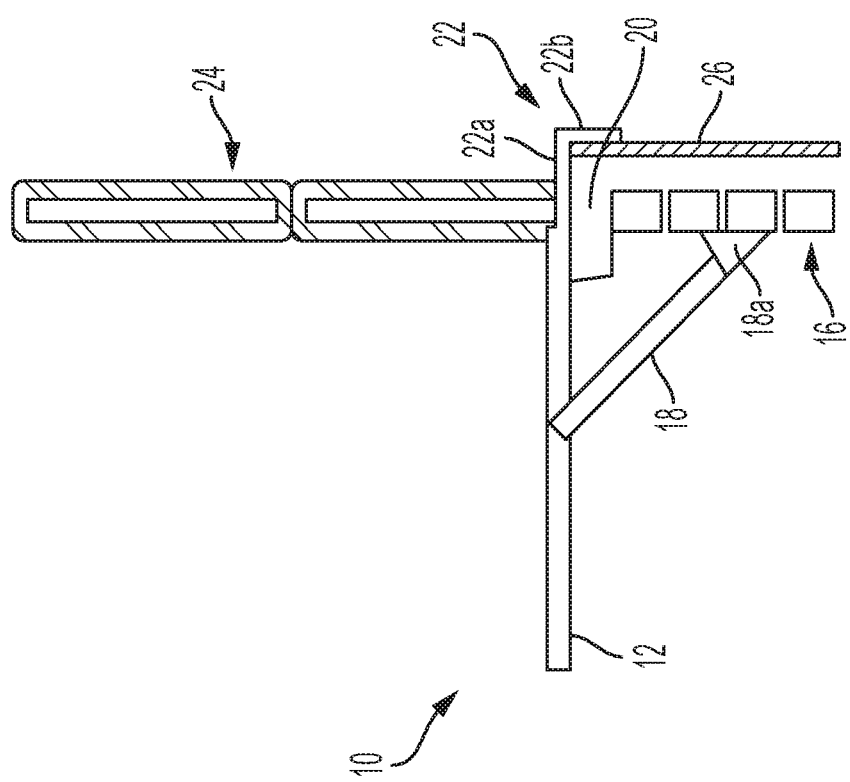
FIG. 1 shows a schematic of a side view of a window unit delivery tower, according to an embodiment of the present disclosure.

Referring to FIG. 1, a schematic side view of a window unit 10 is shown. The window unit 10 may include a frame 12 and a net 14 (FIG. 3). The frame 12 may be formed of aluminum, plastic, or other lightweight material. The frame 12 may be supported on a building wall 16 with one or more building support members 18. Each of the one or more building support members 18 may have a pivot end 18a pivotally coupling the frame 12 and the respective building support member 18 to the building wall 16. The frame 12 may be supported on a window ledge 20 with one or more window support members 22. Each of the one or more window support members 22 may have a horizontal member 22a extending through a window 24 (such as a double hung window) and a vertical member 22b for securing to an interior wall 26 of the building. The window unit 10 may include the frame 12, the net 14, the one or more building support members 18, and the one or more window support members 22. The window unit 10 may support the weight of a package delivered by an aerial vehicle. The window unit 10 may include controller(s), sensor(s), a battery or batteries, light(s), motion device(s), and/or communication device(s), as will be described in more detail.

The window unit 10 may be moveable between a stored position (not depicted) and a deployed position (FIG. 1). In the stored position, the frame 12 (including the net 14) may by positioned substantially parallel and adjacent the building wall 16. The frame 12 may be pivoted to the stored position with pivot end 18a. The frame 12 may be slidable, hinged, or pivotable with respect to horizontal members 22a to allow for the frame 12 to align parallel with the building wall 16. In the stored position, the window unit 10 may be aligned, parallel, or adjacent the building wall 16 so as not to extend perpendicular to the building wall 16. In the deployed position of FIG. 1, the frame 12 (including the net 14) may be positioned substantially perpendicular to the building wall 16 and/or the window 24. The frame 12 may be pivoted to the deployed position with pivot end 18a. In the deployed position, the window unit 10 may extend perpendicularly from the building wall 16 so as to receive a package delivered from an aerial vehicle. The window unit 10 may include a locking device to maintain the window unit 10 in the stored position and/or the deployed position.

Figure 2:
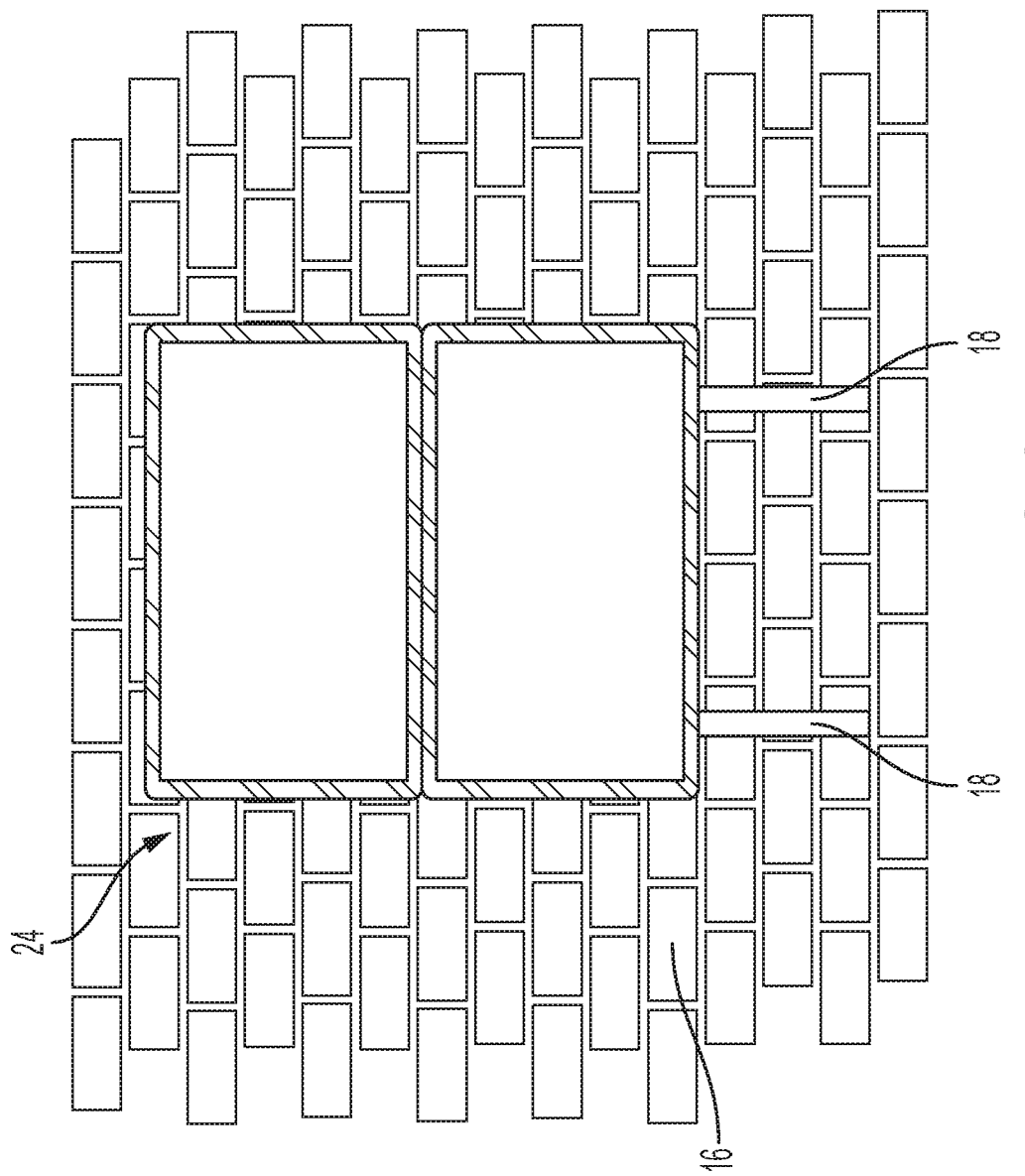
FIG. 2 shows a schematic of a front view of the window unit delivery tower of FIG. 1.

Referring to FIG. 2, a schematic front view of the window unit 10 is shown. As previously mentioned, the frame 12 may be supported on the building wall 16 with one or more building support members 18. Although two building support members 18 are depicted, more or fewer building support members 18 may be provided. The window unit 10 may be positioned immediately beneath the window 24. In this manner, the window 24 may be opened to receive the package from the net 14 (FIG. 3). The window unit 10 may be located such that the window 24 is allowed to close and seal without interference of the window support member 22 (FIG. 1) and/or the frame 12 (FIG. 1). Although the window 24 is depicted as a double hung window, other windows may be provided, such as, for example, a casement window, a sliding window, a single hung window, etc.

Referring to FIG. 3, the net 14 may be held taut within the frame 12. The net 14 may be taut while still allowing for stretch of the net 14 to cushion the delivery of a package (not depicted). Although the frame 12 and net 14 are depicted as rectangular, other shapes are contemplated, such as square, circular, polygonal, etc. The net 14 may be stretched so that it is taut or has a little give in the middle of the net 14. The net 14 may be tightened or loosened with respect to the frame 12 based on the dimension, size, and weight of the package to be delivered (as communicated to the window unit by the aerial vehicle and/or consumer's mobile device). The amount the package is cushioned (or allowed to bounce) by the net 14 may be selected and altered based on the aforementioned factors.

The net 14 and/or the frame 12 may include a release device. The release device may be electronic or manual. The release device may allow the net 14 to remove from the frame 12 and/or the frame 12 to release from the building wall 16. During delivery, the aerial vehicle, the aerial vehicle delivery mechanism, and/or the package may become tangled, entwined, or otherwise snagged or stuck in the window unit 10. The aerial vehicle and/or window unit 10 may sense the aerial vehicle, aerial vehicle delivery mechanism, and/or package is stuck and may communicate the same to the aerial vehicle and/or window unit 10 (e.g. sensing a threshold pressure on the net 14 and/or frame 12).

Once the signal is received that a component is stuck in the window unit 10, the window unit 10 (or the aerial vehicle) may actuate the release device. The release device may release the net 14 and/or the frame 12 and allow the aerial vehicle to navigate away from the window unit 10 with the net 14 and/or frame 12 attached thereto. The aerial vehicle may navigate to its home base or other location for removal of the net 14 and/or frame 12. Thus, if there is a snag or hang up of the aerial vehicle with the window unit 10, the aerial vehicle and package may be salvaged by releasing components of the window unit 10 and allowing the aerial vehicle to navigate to another location to remedy the snag or stuck components.

Alternatively, the release device may actuate automatically when a threshold pressure is reached. For example, the release device may be shear pins or other shear type connectors which break when a predetermined pressure is placed on the pins. The shear pins may couple the net 14 to the frame 12 and/or the frame 12 to the building support member 18. When the shear pin(s) experiences a predetermined pressure, the pin(s) breaks allowing the net 14 and/or frame 12 to break free.

The window unit 10 may include one or more controllers. The one or more controllers may control the position (such as a deployed position or stored position) of the window unit 10. The one or more controllers may include electronic buttons or mechanical buttons which allow for storage or deployment of the window unit 10. The one or more controllers may control the release device, the motion devices for moving the package closer to the window 24, and/or communication device(s). The one or more controllers may communicate with the aerial vehicle, the consumer's mobile device, and/or sensors on the window unit 10.

The window unit 10 may include one or more communication devices. The one or more communication devices may allow the window unit 10 to communicate with components of the window unit 10, the aerial vehicle, and/or a mobile application ("app") on the consumer's mobile device. The one or more communication devices may be two-way communication devices and may allow for sending and/or receiving signals to the aerial vehicle. The one or more communication devices may send and/or receive signals with a mobile device, such as a consumer's mobile phone or mobile tablet. The aerial vehicle may use its on-board sensors, such as imaging devices and cameras, to locate the window unit 10 and/or to verify the location for delivery. The aerial vehicle may use image capabilities (including optical or other image sensors) to locate the window unit or verify the coordinates sent from the window unit and/or mobile device. The image capabilities may also verify delivery of the package.

The window unit 10 may include one or more sensors located on the frame 12 and/or the net 14. The one or more sensors may include optical sensors, pressure sensors, temperature sensors, motion sensors, microweather sensors, and/or mechanical sensors. The one or more sensors may communicate with the aerial vehicle, the window unit 10, and/or the mobile device to ensure the frame 12 and net 14 are aligned properly with the package and/or aerial vehicle for delivery. The one or more sensors may provide an absolute reading that the package is fully within the net 14 prior to releasing the package from the aerial vehicle. This may ensure the package is delivered to the net 14 and does not fall to the ground (or onto a person standing on the street below), which may be several or many stories below the net 14. The one or more sensors may sense a weight in the net 14 has increased and send a signal to the consumer's mobile device that the package has been delivered (e.g. with a load cell or weight sensor).

The one or more sensors may allow the aerial vehicle to align with the window unit 10 and/or allow the window unit 10 to align with the aerial vehicle. For example, one or more sensors may be provided on both the aerial vehicle and the window unit 10. The one or more sensors on the window unit 10 may be reflectors located on each side and/or each corner of the frame. The reflectors may be sensed by the aerial vehicle (such as with one or more optical sensors). The aerial vehicle may navigate to a position between the reflectors based on the information from the sensors on the aerial vehicle. This may ensure the aerial vehicle is fully within the boundaries of the net 14 (e.g. fully within the frame 12) prior to delivery of the package.

The sensor(s) on the aerial vehicle and window unit 10 may communicate with one another to ensure proper delivery of the package. The sensors may communicate such that the package is not released from the aerial vehicle until confirmation of receipt or alignment of package is transmitted from the window unit 10 to the aerial vehicle (i.e. similar to passing of a baton in a relay race). For example, the aerial vehicle may lower the package with a delivery mechanism until the package touches, lands, or is aligned with the net 14. The window unit 10 may sense the package is placed on the net 14 (e.g. with a load cell or weight sensor) or within the frame 12 (e.g. with optical sensors). The window unit 10 may communicate to the aerial vehicle that the package is on the net 14. After receipt of this communication, the aerial vehicle may actuate the delivery mechanism to release the package. In this manner, the package is confirmed to be fully within the window unit 10 prior to release from the aerial vehicle.

The one or more sensors on the window unit 10 and/or aerial vehicle may be heat sensor(s) and/or motion sensor(s). The heat and/or motion sensor(s) may detect if a person and/or animal is located below the window unit 10 and in alignment with the net 14 of the window unit 10. In order to avoid injury or potential injury to the person below the window unit 10, the aerial vehicle may pause or halt delivery until the sensor(s) no longer detect a person is aligned with the net 14. After the sensor(s) detect no person below the net 14, delivery of the package may be completed.

The one or more sensors on the window unit 10 and/or aerial vehicle may be a microweather sensor. The microweather sensor may sense the weather conditions at the window unit 10. For example, where a window unit 10 is located on a high level (e.g. floor 20) of a high-rise building, the weather at this location may be different than the weather at a lower or less dense location. The microweather sensor may detect the speed of winds, the air pressure, the air temperature, etc. The microweather sensor may communicate the weather at the window unit 10 with the aerial vehicle. The aerial vehicle may evaluate the weather and adjust delivery of the package as necessary to effectuate a successful delivery based on a predetermined weather condition. In one example, the winds at the window unit 10 may be too high and the aerial vehicle may evaluate the winds to determine the odds of a successful delivery is low (e.g. wind will blow the package off, wind is blowing the net 14 or frame 12 such that it is not steady, etc.). If the likelihood of a successful delivery is low, the aerial vehicle may abort delivery and return, with the package, to the home location.

The one or more sensors on the window unit 10 and/or aerial vehicle may be a mechanical sensor, such as, for example, feelers or antennae. The aerial vehicle may have feelers and/or antennae on the delivery mechanism and/or extending downward from the body of the aerial vehicle. The feelers and/or antennae may push up or place pressure on the frame 12 and/or net 14. When the aerial vehicle senses the pressure on the feelers and/or antennae, the aerial vehicle may confirm alignment with the window unit 10 and perform delivery of the package. The threshold pressure may be low such that the frame 12 is not pushed downward or out of contact with the building and/or net 14 is not pushed out of the frame 12. Where a release mechanism is included on the window unit 10, the threshold pressure for confirmation of alignment may be lower than the pressure to cause actuation or release of the release mechanism. In this manner, accidental actuation of the release mechanism is avoided. Thus, the feelers and/or antennae may confirm alignment of the aerial vehicle and package with the window unit 10 without placing a lot of pressure on the frame 12 and/or net 14. Alternatively, the feelers and/or antennae may extend upward from the frame 12 of the window unit 10. The aerial vehicle may contact the upward extending feelers and operate in a similar manner as previously described to confirm alignment for delivery of the package.

The window unit 10 may include battery or batteries to provide power to the controller(s), communication device(s), and/or any mechanical and electrical component(s). The battery or batteries may be rechargeable. The battery or batteries may be solar powered. The battery or batteries may be plugged into house current or a designated recharging station to recharge the window unit 10 and associated components.

The window unit 10 may include one or more lights (e.g. light emitting diodes capable of producing any color) to signal to a consumer and/or to the aerial vehicle that delivery of a package is imminent or has been completed. The light(s) may signal to the aerial vehicle the location for delivery, the light being sensed by a sensor (e.g. an optical sensor) onboard the aerial vehicle.

The window unit 10 may include one or more motion devices for moving the window unit 10 between the stored and deployed positions and/or for moving the package from the window unit 10 toward the window 24 for retrieval. The one or more motion devices may include wheels, rollers, telescoping arms, and/or motors. The motion device(s) may allow for the window unit 10 to move from the stored position to the deployed position. The motion device(s) may be actuated via a signal from the aerial vehicle, a consumer's mobile device, and/or manually via control buttons located on the window unit 10. The telescoping member and/or roller may be located on or integral with the net 14. The package may be placed on the telescoping member and/or roller during the delivery phase of the package. After the package is placed on the window unit 10, the telescoping member and/or roller may be actuated to move the package from a far or central portion of the net 14 toward the window 24. The actuation may be performed manually, via a signal from the window unit 10, the consumer's mobile device, the aerial vehicle, or a button located on the window unit 10. The whole or entire frame 12 with net 14 therein may telescope or roll from the interior and/or exterior for storage or retrieving the package.

Referring to FIG. 4, a block diagram of a delivery system including one or more of the window units of the present disclosure is depicted. The window unit(s) and/or associated components of the window unit may communicate with the aerial vehicle to receive information on package delivery, receive instructions on deployment, receive instructions of storage, and send confirmation of package receipt. The window unit(s) and/or associated components may further communicate with the consumer's mobile device to receive information on package delivery, receive instructions on deployment, receive instructions of storage, and send confirmation of package receipt. The aerial vehicle may communicate with the consumer's mobile device to send or receive information on package delivery, send or receive instructions on deployment, send or receive instructions of storage, and send or receive confirmation of package receipt. The aerial vehicle and/or the mobile device may communicate with the warehouse to send or receive information on package delivery, and send or receive confirmation of package receipt. The sensor(s), release device(s), controller(s), communication device(s), and/or motion device(s) of the window unit may send and receive signals with the aerial vehicle and the consumer's mobile device.

When an aerial vehicle (not depicted), such as a UAV, is scheduled to deliver a package (not depicted) to a consumer, the window unit 10 may be moved from the stored position to the deployed position of FIG. 1. For example, when the aerial vehicle is near the delivery location, for example, within about a mile of the delivery location, the aerial vehicle may communicate with the window unit 10 and/or the consumer's mobile device. The aerial vehicle may send a signal to the window unit 10 and/or the consumer's mobile device with instructions to move the window unit 10 from the stored position to the deployed position of FIG. 1. Movement of the window unit 10 from the stored position to the deployed position and/or from the deployed position to the stored position may be performed manually by the consumer or autonomously as instructed by the aerial vehicle and/or the consumer's mobile device.

The aerial vehicle may communicate with the window unit 10 to ensure proper alignment of the package within the frame 12 and net 14 of the window unit 10 and to ensure no people or animals are located below the window unit 10, as has been previously described. Once the package is aligned within the frame 12 and net 14 of the window unit 10, the delivery mechanism of the aerial vehicle may lower and release the package onto the net 14. It is desired to avoid free fall of the package onto the net 14 and frame 12. The window unit 10 may sense the package has been delivered and released from the aerial vehicle (e.g. by sensing an increase in load on the net 14 and/or frame 12). The window unit 10 may communicate to the aerial vehicle and/or a consumer's mobile device confirming package delivery. In the event the package, delivery mechanism, and/or aerial vehicle becomes snagged with the window unit 10, the frame 12 and/or net 14 may be released in one of the aforementioned manners.

After delivery of the package into the net 14 of the window unit 10, the consumer may retrieve the package from the window unit 10. The consumer may open the window 24, reach through the window 24, and retrieve the package from the net 14. The net 14 and/or the frame 12 may include a movable device, such as rollers or a roller platform, to move the package from one side of the net 14 to a position adjacent or near the window 24, such that the consumer may easily retrieve the package. After retrieval of the package, the window unit 10 may be moved to the stored position.

The window unit 10 of the present disclosure may allow for delivery of packages to tall buildings, such as high-rise buildings and/or medium-rise buildings. The window unit 10 may include sensors, communication device(s), and/or controller(s) to confirm alignment of the package from the aerial vehicle before release of the package by the aerial vehicle. This may allow for overhead protection of people or animals located below the window unit 10. Packages may be delivered to window units high up, avoiding the need for the aerial vehicle to land.

Although the foregoing description is directed to the preferred embodiments of the invention, it is noted that other variations and modifications will be apparent to those skilled in the art and may be made without departing from the spirit or scope of the invention. Moreover, features described in connection with one embodiment of the invention may be used in conjunction with other embodiments, even if not explicitly stated above.

We claim:

1. A method for aerial delivery of a package to a window of a building, the method comprising:
providing a window unit adjacent the window, the window unit including a frame and a net;
moving the window unit from a stored position to a deployed position;
sensing the package is aligned within a boundary of the window unit;
communicating the package is aligned within the boundary of the window unit with an aerial vehicle;
lowering a delivery mechanism of the aerial vehicle, the delivery mechanism coupled to the package;
sensing a temperature or motion below the window unit and pausing delivery of the package until the temperature or motion confirms no person or animal is located beneath the window unit;
releasing the package from the delivery mechanism;
moving the package toward the window; and
retrieving the package from the window unit.

2. The method of claim 1, wherein sensing the package is aligned within a boundary of the window unit includes pressing feelers of the aerial vehicle on the frame of the window unit.

3. The method of claim 1, further comprising releasing with a release device the net and the frame when a predetermined pressure is experienced by the net and frame.

4. A method for aerial delivery of a package to a window of a building, the method comprising:
providing a window unit adjacent the window, the window unit including a frame and a net;
moving the window unit from a stored position to a deployed position;
sensing the package is aligned within a boundary of the window unit;
communicating the package is aligned within the boundary of the window unit with an aerial vehicle;
lowering a delivery mechanism of the aerial vehicle, the delivery mechanism coupled to the package;
sensing a microweather at the window unit, evaluating the microweather, and pausing a delivery of the package if a predetermined condition is sensed;
releasing the package from the delivery mechanism;
moving the package toward the window; and
retrieving the package from the window unit.

5. The method of claim 1, further comprising releasing the package from the delivery mechanism only when full alignment of the package with the window unit is achieved.

* * * * *